United States Patent
Hanik et al.

(10) Patent No.: US 6,965,736 B1
(45) Date of Patent: Nov. 15, 2005

(54) METHOD FOR MONITORING THE TRANSMISSION QUALITY OF AN OPTICAL TRANSMISSION SYSTEM, IN PARTICULAR OF AN OPTICAL WAVELENGTH-DIVISION MULTIPLEX NETWORK

(75) Inventors: Norbert Hanik, Berlin (DE); Herbert Schmid, Hainburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/913,375

(22) PCT Filed: Jan. 20, 2000

(86) PCT No.: PCT/EP00/00420

§ 371 (c)(1),
(2), (4) Date: Nov. 29, 2001

(87) PCT Pub. No.: WO00/48337

PCT Pub. Date: Aug. 17, 2000

(30) Foreign Application Priority Data

Feb. 12, 1999 (DE) .................. 199 05 814

(51) Int. Cl.⁷ .................. H04B 10/08; H04J 14/02
(52) U.S. Cl. .................. 398/27; 398/14; 398/17; 398/20; 398/34
(58) Field of Search .................. 398/10, 14, 17, 398/20, 25, 27, 34

(56) References Cited

U.S. PATENT DOCUMENTS 5,144,642 A * 9/1992 Weinberg et al. .......... 375/228

OTHER PUBLICATIONS

*Mueller, et al., "Application of Amplitude Histograms For Quality of Service Measurements of Optical Channels and Fault Identification," ECOC98, Sep. 20-24, 1998, Madrid, Spain, pp. 707-708.
*Patent Abstracts of Japan, & JP 10 239214 A, vol. 1998, No. 14, Sep. 11, 1998.
*Shake, et al., "Optical Signal Quality Monitoring Method Based on Optical Sampling," Electronics Letters, vol. 34, No. 22, Oct. 23, 1998, pp. 2152-2154.
*Atsushi Hiramatsu, "Training Techniques for Neural Network Applications in ATM," IEEE Service Center, New Jersey, U.S.A., vol. 33, No. 10, Oct. 1, 1995, pp. 58, 63-67.

* cited by examiner

Primary Examiner—Leslie Pascal
(74) Attorney, Agent, or Firm—Kenyon & Kenyon

(57) ABSTRACT

A method for monitoring the transmission quality of an optical transmission system, such as, for example, an optical wavelength division-multiplex network. An amplitude histogram of an optical signal (transmission signal) transmitted over the transmission system may be plotted and classified, with the assistance of a neural network, according to bit error rates and/or causes of faults. The need for setting requirements for transmission mode, transmission format and/or transmission timing cycle of the transmission system may be eliminated. The amplitude histogram may be implemented for any signal, and causes of faults, which are not able to be determined by a conventional bit rate classification, may be allocated.

9 Claims, 3 Drawing Sheets

Multi-layer perceptron

METHOD FOR MONITORING THE TRANSMISSION QUALITY OF AN OPTICAL TRANSMISSION SYSTEM, IN PARTICULAR OF AN OPTICAL WAVELENGTH-DIVISION MULTIPLEX NETWORK

This application is a 371 of PCT/EP00/00420, filed Jan. 20, 2000.

FIELD OF THE INVENTION

The present invention is directed to a method for monitoring the transmission quality of an optical transmission communications system, in particular of an optical wavelength-division multiplex network.

BACKGROUND INFORMATION

In optical transmission systems including, for example, in optical wavelength division-multiplex systems (WDM systems), the problem may arise of having to monitor the transmission quality, in order to guarantee a certain (quality of service—QoS) and to be able to detect slow system degradations. Transparent, optical wavelength division-multiplex systems may be increasingly used, perhaps because they are believed to significantly increase the capacity and flexibility of today's information and telecommunications networks. Not only is an optical signal of a single wavelength transmitted via an optical fiber, but, by employing a plurality of wavelengths, a plurality of mutually independent optical channels may be made available.

Optical wavelength division-multiplex networks are transparent, analog transmission systems, which may be used for transmitting digital useful signals, and for implementing different telecommunications services. The transparency involves selecting the data rates and the format for each optical channel of a wavelength division-multiplex system independently of one another. This additionally acquired flexibility may be used to accommodate the demands of customers and to facilitate the integration of new services.

It is believed that the undefined data format may pose a serious problem in transparent networks.

The bit error rate (BER) may be considered in assessing the quality of service of a digital signal in the transmission over an optical network. It is believed that to estimate the BER of the transmitted useful signal, specific overhead bytes of the selected transmission format (e.g., SDH, ATM, etc.) are analyzed. It is believed that this method cannot be used in transparent optical systems, where the data format is "a priori" not defined. Moreover, the evaluation of the BER does not appear to permit any conclusions to be drawn with respect to the cause of a possibly occurring signal degradation. If merely the eye diagram of the received data signal is evaluated in order to assess the signal quality, then it is believed that this method requires the bit timing of the signal to be evaluated as well. Electronically acquiring the bit timing is allowable with a justifiable outlay or reasonable expenditure for fixed data rates known to the system to be evaluated. This ancillary condition or constraint may restrict the transparency of optical transport networks (WDM networks).

The reference "Application of Amplitude Histograms for Quality of Service Measurements of Optical Channels and Fault Identification," by K. Mueller et al., ECOC 98, Sep. 20–24, 1998, Madrid, Spain, pages 707–708, discusses a method for characterizing optical transmission channels which provides for evaluating amplitude histograms. It is believed that these are acquired in that the optical signal is detected by a photodiode, which, in turn, emits an electric signal that is sampled asynchronously. The amplitude histograms may enable conclusions to be drawn with respect, for example, to the extent and the cause of slow degradations in the transmission quality.

The reference Patents of Japan, vol. 1998, no. 14, JP 10 23 92 14 A, Sep. 11, 1998, discusses a method for calculating the loss in the transition region between two optical waveguides (connection loss) for an operational wavelength. It is believed that the calculation may be carried out using a neural network, which undergoes a training until the difference between the output signal from the neural network and a training signal exceeds a specific value.

The reference "Optical Signal Quality Monitoring Method Based on Optical Sampling," I. Shake et al., Electronics Letters, vol. 34, no. 22, Oct. 29, 1998, pages 2152–2154, discusses a method for monitoring the average Q-factor of an optical signal in an optical transmission system, amplitude histograms of optical signals being measured. From this, it is believed that information is derived about the signal-to-noise ratio of a digital signal.

The reference "Training Techniques for Neural Network Applications in ATM," Atsushi Hiratsu, IEEE Communications Magazine, IEEE Service Center, Piscataway, N.Y., U.S.A., no. 10, vol. 33, Oct. 1, 1995, pages 58, 63–67, discusses the training of neural networks.

SUMMARY OF THE INVENTION

An exemplary method of the present invention is directed to providing a method for monitoring the transmission quality of an optical transmission system, which may be suited, for example, for controlling a transparent transmission system, for example, a WDM network, in which the data rate and the transmission format are defined flexibly and not fixed "a priori".

Another exemplary method of the present invention is directed to providing a method for monitoring the transmission quality of an optical transmission system, in which an amplitude histogram of an optical signal transmitted over the transmission system (transmission signal) may be plotted, and may be classified according to bit error rates and/or causes of faults, including:
  from the amplitude histogram, input data are acquired (or extracted), which are fed to a neural network, which, from the input data, generates output values, and the output values are assigned to estimates of the bit-error rate of the signal, and/or
  the output values are assigned to causes of fault (or interference) of the signal, such as noise, cross-talk, and signal distortions.

Another exemplary embodiment and/or exemplary method of the present invention is directed to assessing the quality of service (characterized by the bit error rate BER) of a transparent, digital useful signal, by acquiring analog values independently of the data rate to be analyzed and the cause (e.g., noise, dispersion, crosstalk . . . ) and level (or magnitude) of the system degradation. In contrast to methods which may determine the bit error rates at the digital level and, thus, may assess an analog transmission system on the basis of digital parameters, an exemplary method of the present invention is directed to providing a method which employs an essentially direct assessment criterion, namely the amplitude distribution of the analog optical transmission signal.

From this amplitude distribution, information may be obtained on the state of the communication system. This may be accomplished using a neural network, in that the information may be assigned to specific digital parameters, namely to specific values of the BER. In addition, by evaluating an amplitude histogram, conclusions may be drawn with respect to the type of fault that results in a specific BER. This information may be essentially found in the amplitude distribution and may be lost when an analysis is made at the digital level. Another exemplary embodiment and/or exemplary method of the present invention is directed to permitting inferences to be made with respect to the cause of the fault or degradation and, thus, for one to selectively intervene in the communication system in order to eliminate these influences. Furthermore, the need for knowledge of the transmission rate or of the transmission format may be eliminated.

Another exemplary embodiment and/or exemplary method of the present invention is directed to assessing the BER with the aid of learning, neural networks and analog signal values in the form of amplitude histograms as input or measured data, and to pinpoint the cause of a signal degradation. In this context, the exemplary method is as follows: the transmission signal is recorded (or picked up) using an optical detector, for example, a photodiode having a high bandwidth. The detector's electric output signal is sampled asynchronously. For this, there may be no need for any timing recovery. For the sampling operation, an arbitrarily selected time slot and the collection of a large number of sampled values which all contain relevant statistical properties of the signal are found. The time slots of the sampling units should be short enough to also permit rapid, oscillator-type disturbances, such as those caused by in-band crosstalk, to be detected. The amplitude histogram may be recorded using an oscilloscope, for example, which queries the output signal from the detector on the basis of a timing raster (or in a timing pattern).

The data of the amplitude histogram are normalized to make them independent of absolute amplitude values and of the selected scaling of the histogram. The recorded amplitude histogram data may be subsequently preprocessed in appropriate fashion to enable them to be presented to the neural network.

For this purpose, a specific number of y-values, determined at set (or defined) x-values of the histogram diagram, are taken from the amplitude histogram (see FIG. 2). The extracted values may subsequently be uniformly raised such that the highest value is less than 1. At this point, the values may be presented to the neurons of the input layer.

The number of values may correspond to the number of input neurons of the neural network. The neural network may propagate the applied values through the network, assign the input data to a corresponding bit-error rate class, and, as a further output value, flag the type of fault. The functioning and method of operation of neural networks may be discussed in technical literature. In practice, they may be implemented on a data-processing device using a computer program.

For the neural networks to solve the tasks assigned to them, the neural networks should first be trained. Accordingly, various training models may be selected and collected in a training model file (or data set). The training models may be, for example, calculated or measured and preprocessed amplitude histograms, which may correspond to various bit-error rate classes and types of faults.

Neural networks are learning, connectionist systems. They may be composed of a layer of neurons which make up the input layer (input neurons), of one or a plurality of hidden layers (hidden neurons), and of a layer of neurons which make up the output layer. Each neuron may have a specific transfer function. Among the neurons of the various layers, connections exist having different weightings (positive, zero, or negative). The input value of a neuron may be derived from the totality of the weighted output values from the neurons of the preceding layer.

In the training, the individual weights of the connections among the neurons may be adjusted to allow the correct output to appear for the input in question. The functioning and method of operation of the various training algorithms for neural networks may be used. Prior to training or using the neural network, one may select the neural network topology and the training method to be employed. A multi-layer perceptron, which may have undergone a training using a number of training data sets, including with the application of the cascade correlation (CC) or resilient backpropagation (RProp) training methods, is believed to be suited as a neural network.

Thus, there should be no need to develop any mathematical algorithms to provide information about the type of fault that may be occurring and the degree of signal degradation. All signals may be analyzed without knowledge of the transfer format and/or the timing (or clock pulse). For that reason, the transparency of optical transmission systems, such as WDM networks, may be optimally supported and not restricted. Since neural networks may be massively parallel structures, the exemplary embodiments and/or exemplary methods of the present invention should provide for obtaining results much more rapidly than by using a mathematical algorithm. It is believed that another benefit of the exemplary method is that even when assessing unknown, unanticipated input models, meaningful output values may be derived.

DETAILED DESCRIPTION

Figure 1:
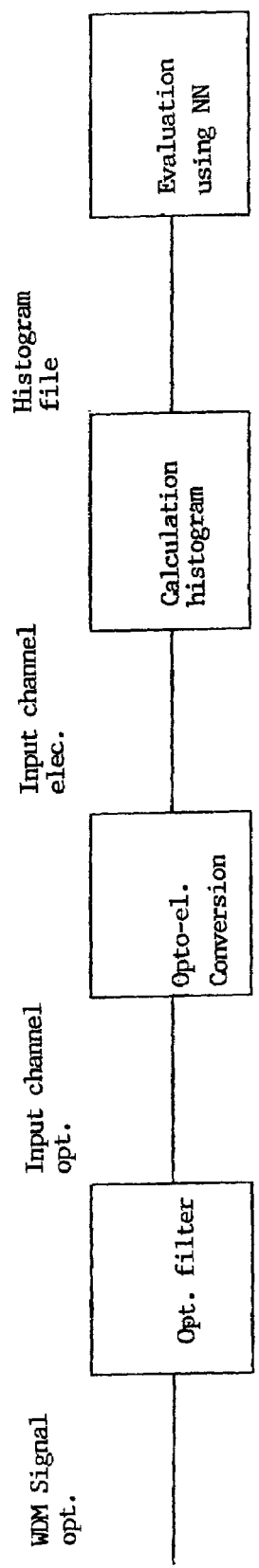
FIG. 1 shows a block diagram of an exemplary method of the present convention.

FIG. 1 shows a block diagram of an exemplary method according of the present invention. From an optical WDM signal, which may be composed of a multiplicity of wavelength components, an optical channel may be selected with the aid of an optical filter. Consequently, only light in a specific wavelength range transmitted by the filter may fall on (or strike) an optoelectronic transducer device. The transducer device may be a photodetector or a photodiode having a high bandwidth, so that even rapid changes in the optical signal can be detected. For example, a photodiode having a 20 Ghz receiving bandwidth may be used.

The transducer device may emit an electric output signal, whose time characteristic may essentially correspond to that of the optical transmission signal of the detected wavelength. This electronic output signal may be sampled asynchronously, the signal height being measured at arbitrary points in time, in each case, integrated over a time slot of a predefined length. To prevent signal fluctuations from being averaged out within the time slot and, thus, to also be able to record rapid signal fluctuations, time slots on the order of picoseconds may be used for data rates in the range of Gbit/s.

To obtain the complete statistics of the transmission signal, a multiplicity of such sampled values may be collected, for example, a few thousand up to a few hundred thousand per histogram. From the sampled values, a histogram may be set up, which indicates the relative frequency of a specific signal amplitude and, as the case may be, of a specific sampled value. The data may be written into a histogram data file which is analyzed by a suitably trained neural network.

Figure 2:
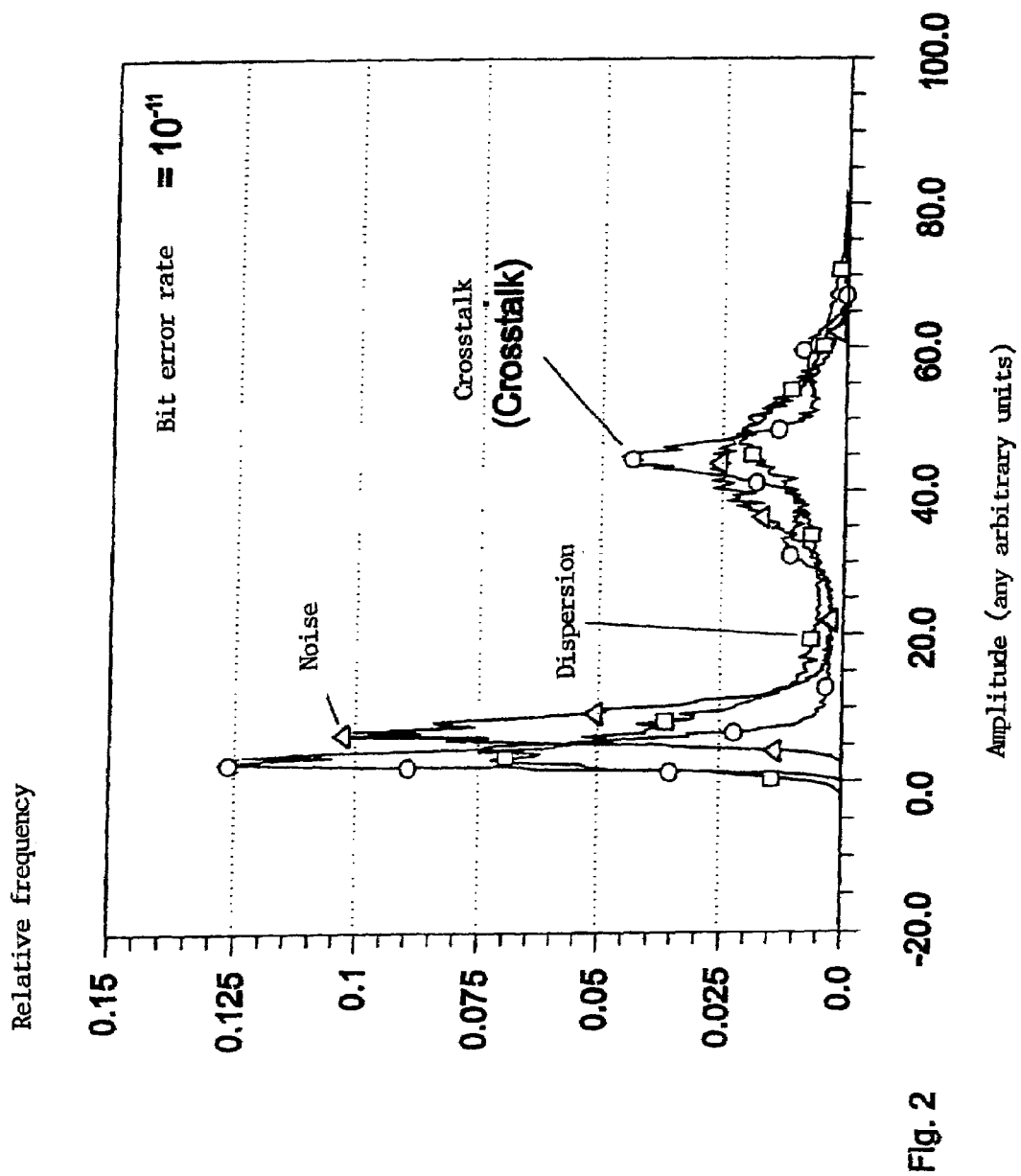
FIG. 2 shows an amplitude histogram of an optical transmission signal.

FIG. 2 shows three examples of histograms, which are assigned to the bit-error rate class BER=$10^{-11}$, according to an exemplary embodiment and/or exemplary method of the present invention. FIG. 2 shows the relative frequency of a specific signal amplitude for three transmission signals. The amplitude may be given in arbitrary units.

To apply the exemplary method, the neural networks being used should first be trained. To this end, training data sets were used, as described in the following:

The three histograms correspond to externally modulated digital signals having a data rate of 5 GBit/s and a non-return-to-zero (NRZ) data format. The digital data were produced using a random-number generator of the periodicity $2^{15}-1$. The signal was interfered, on the one hand, by summing a delayed and attenuated signal component to simulate in-band crosstalk. A noisy signal (noise) was generated by employing an attenuating element and an erbium amplifier during the signal transmission. A signal interfered by dispersion was generated by cascading standard optical fibers of variable length.

Although the same bit-error rate class is assigned to each of these three types of faults in the illustrated example, FIG. 2 reveals markedly different amplitude histograms, which can be used to infer the cause of the fault through model allocation. The differences in the characteristic curve of the amplitude histogram in response to different causes of faults may be acquired by a neural network and assigned to a specific bit-error rate class and to one or a plurality of causes of faults. This allows identification of mixed causes of faults.

Figure 3:
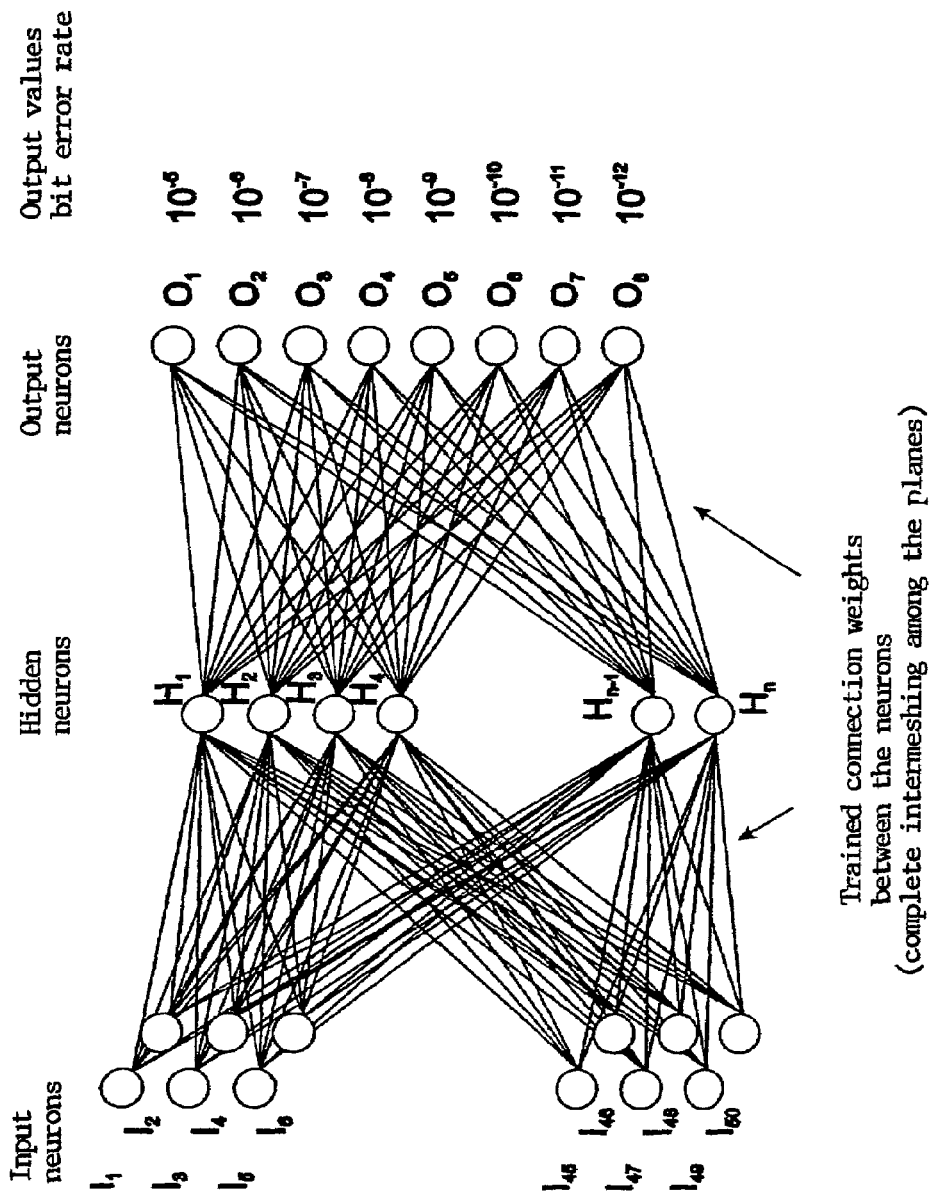
FIG. 3 shows a topology of a neural network in the form of a multi-layer perceptron.

To automate analyzing the histograms and to assign them to bit-error rate classes, neural networks may be used. An exemplary neural network is depicted in FIG. 3 which shows the topology of a "multi-layer perceptron" neural network. It has an input register of 50 input neurons which may be used for inputting 50 values from the histogram (input vector).

These input values may be mapped by the neural network onto a number of output values, the output vector. The input-output relation may not be known, but should be taught to the neural network. It may be modified by adjusting the individual weights of the connections among the neurons of the individual layers, in a training procedure. In this case, the neural network was trained using the "back-propagation" algorithm. The backpropagation algorithm is discussed in, for example, "Training Techniques for Neural Network Applications in ATM," A. Hiramatsu, IEEE Communication Magazine, October 1995, pages 58–67.

To assign measured histograms to bit-error rate classes, 370 histograms representing transmission signals having bit error rates of $10^{-12}$ through $10^{-5}$ were plotted on a trial basis. The signal degradation was caused by noise, crosstalk, or dispersion. In a data preprocessing, 50 values from each histogram were compiled in an input data set for the neural network and used as an input for the neural network. A portion of the input data sets were used as a training input model, the rest as a test input model, in order to validate the exemplary method. The neural network was trained using the training models, in which case one of the training algorithms "resilient backpropagation" (Rprop) or "cascade correlation" (CC) was used. Following the training phase, the test models were applied to determine whether the neural network assigned the correct, previously experimentally determined bit error rates to the test histograms.

Each output neuron of the neural network in FIG. 3 represents a bit-error rate class of $10^{-5}$ through $10^{-12}$. The amplitude of the signal at the particular output neuron indicates to which BER class(es) the input model is to be assigned. In the above example, the plotted amplitude histograms were able to be assigned with very high level of reliability to the previously determined BER class.

The neural network may be trained such that, besides the BER class, the type of fault may also be inferred from the output vector, i.e., from the entries of the output neurons. For this, the appropriate number of output neurons should be provided to ensure that the output vector represents the relevant BER classes, as well as the relevant types of faults. In the above example including eight BER classes and three types of faults, it follows that ten output neurons should be provided and the neural network should be trained accordingly.

The exemplary embodiment and/or exemplary method of the present invention may be used industrially for monitoring the transmission quality of an analog, optical transmission system, for example, a WDM network. Besides allowing classification of the transmission quality in accordance with specific bit-error rate classes, the exemplary embodiments and/or exemplary methods of the present invention may be used for detecting or searching out causes of degradation. This may enable a selective counter-control on the part of the telecommunications carrier to prevent further system degradation.

What is claimed is:

1. A method for monitoring transmission quality of an optical signal in an optical transmission system, the method comprising:

plotting an amplitude histogram of the optical signal transmitted over the optical transmission system;

classifying the amplitude histogram of the optical signal according to at least one of bit error rates and fault causes by:

acquiring input data from the amplitude histogram, feeding the input data to a neural network, generating at least one output value from the input data, and assigning the at least one output value to at least one of: the bit-error rates of the optical signal; and the fault causes of the optical signal.

2. The method of claim 1, wherein the optical transmission system includes an optical wavelength division-multiplex network.

3. The method of claim 1, further comprising:

preprocessing the amplitude histogram so that the amplitude histogram is a normalized amplitude histogram before presenting the amplitude histogram to the neural network;

selecting a predefined number of data from the normalized amplitude histogram for providing a number of selected data; and feeding the number of selected data to at least one input neuron of the of the at least one input neuron.

4. The method of claim 1, further comprising:
asynchronously sampling the optical signal following an optoelectronic conversion to obtain at least one sampled value; and
entering at least one sampled value into the amplitude histogram.

5. The method of claim 4, wherein a length of a time slot used for the sampling of the optical signal is adapted to a data transmission rate so that rapid oscillations in an amplitude of the optical signal are detectable and are not averaged out.

6. The method of claim 5, wherein the length of the time slot is on the order of picoseconds.

7. The method of claim 1, wherein the optical signal is transmitted with a predefined fundamental wavelength over an optical channel for a wavelength-division multiplex network.

8. The method of claim 1, wherein the neural network includes a multi-layer perceptron that has undergone a training using at least one training data set having a known output value and using at least one of a cascade correlation training method and a resilient backpropagation training method.

9. The method of claim 1, wherein the at least one fault cause of the optical signal includes at least one of noise, cross-talk and signal distortions.

* * * * *